Dec. 4, 1951  S. D. POOL ET AL  2,577,361
BALL PUMP
Filed Aug. 3, 1949
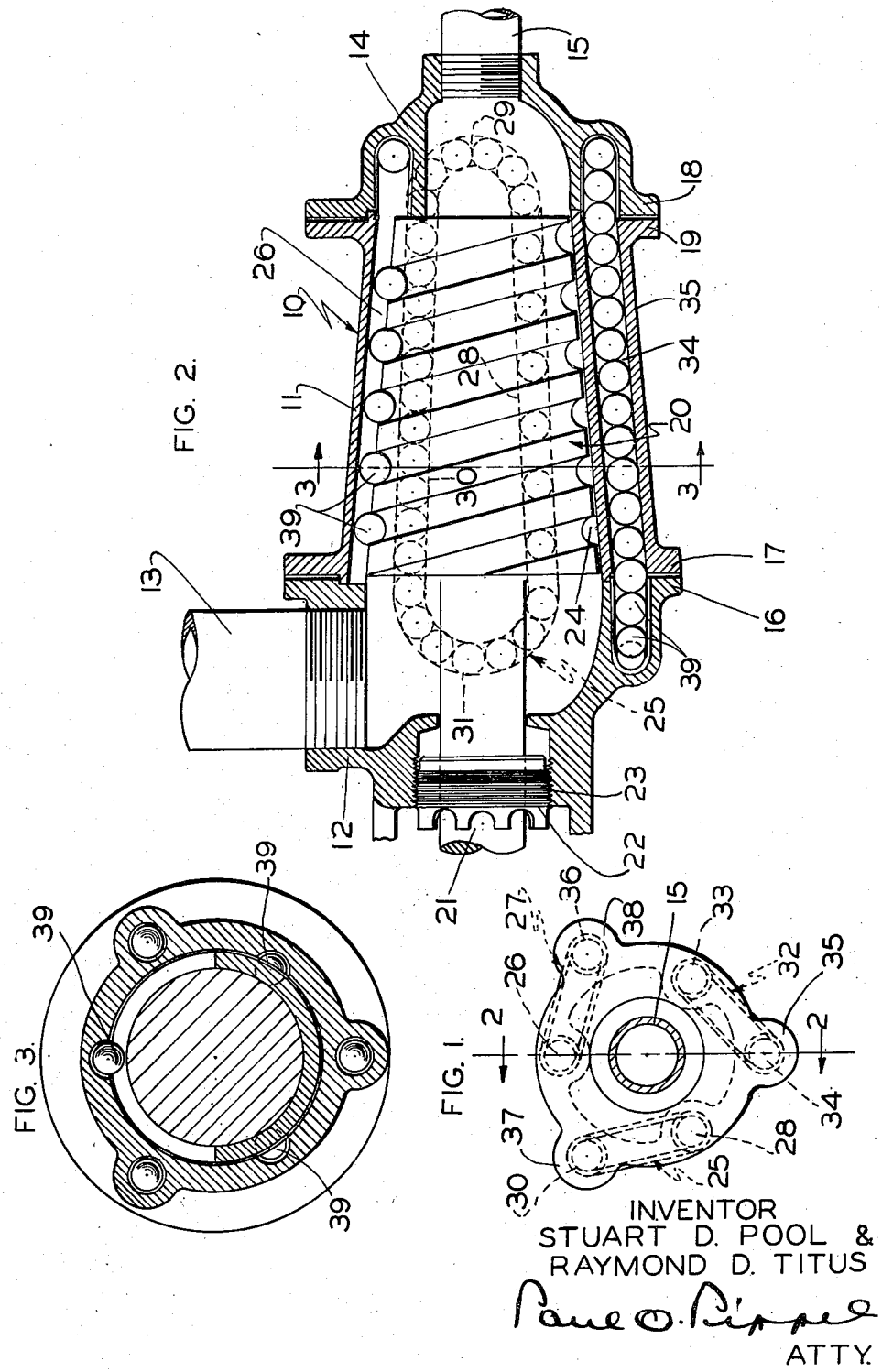
INVENTOR
STUART D. POOL &
RAYMOND D. TITUS
Paul O. Pippel
ATTY.

Patented Dec. 4, 1951

2,577,361

UNITED STATES PATENT OFFICE 2,577,361

BALL PUMP

Stuart D. Pool and Raymond D. Titus, Moline, Ill., assignors to International Harvester Company, a corporation of New Jersey Application August 3, 1949, Serial No. 108,353

1 Claim. (Cl. 103—117)

This invention relates to a new and improved ball pump.

There have been many types of pumps manufactured and used. However, in order to obtain high pressures and high volumes of flow, it has been necessary to operate these prior pumps at extremely high speeds and/or employ very accurately machined pump elements. It is therefore a principal object of this invention to provide a pump capable of developing high pressures and a constant and high volume flow with a minimum of operating speed and machine elements only necessitating ordinary tolerances.

An important object of this invention is the provision of a pump or compressor employing a plurality of spaced balls and mechanical means for gradually decreasing the space between the balls to thus automatically compress the fluid therebetween and/or compensate for back leakage.

Another important object of this invention is to supply a rotor-type ball pump in which a plurality of balls are used to entrain fluid therebetween, and the rotor causes movement of the balls in such a manner that the spacing between the balls is gradually diminished to cause the entrained fluid to be placed under pressure.

A further important object of this invention is to provide a pump having a conical rotor and ball track means formed in the rotor and its accompanying housing, and spiral grooves around the periphery of the conical rotor to effect longitudinal movement of a plurality of balls in the ball tracks to thus cause fluid positioned between adjacent balls to be placed under compression.

Another and still further important object of this invention is the provision of a ball-type pump in which the inlet side normally creates a slight suction to facilitate easy entrance of fluid therein.

Another and still further important object of this invention is to provide a rotor-type ball pump having a plurality of endless ball paths, and paths including portions within the rotor and return portions outside the rotor and including a plurality of balls in each of the endless ball paths, whereupon fluid entering the ball pump is placed under compression by the balls during movement through the rotor.

Other and further important objects of this invention will become apparent from the disclosures in the following specification and accompanying drawing.

In the drawing:

Fig. 1 is an end elevational view of the ball pump of this invention.

Fig. 2 is a longitudinal sectional view taken on the line 2—2 of Fig. 1.

Fig. 3 is a sectional view taken on the line 3—3 of Fig. 2.

As shown in the drawing:

The reference numeral 10 indicates generally a housing or supporting structure for the ball pump of this invention. The housing consists of a central conical section 11, a first end housing 12 having an inlet 13 therein and a second end housing 14 having an outlet or pump discharge as shown at 15. The end housing 12 is provided with an enlarged annular flange 16 for joining with an annular flange 17 on the central conical portion 11 of the housing 10. Similarly the end housing 14 is attached to the central portion 11 by annular flange means 18 on the end housing 14 and an annular flange 19 on the end of the central portion 11. Suitable bolt or other clamp means may be employed to hold the flanges 16 and 17 and 18 and 19 together.

A conical shaped rotor 20 is positioned within the central portion 11 of the housing 10, and drive is imparted to the rotor by means of a laterally extending shaft 21 projecting outwardly from the end housing 12. A removable threaded bushing 22 is adapted to engage a threaded opening 23 in the end housing 12. Suitable seal means and a thrust bearing is employed between the bushing and the shaft 21 to prevent passage of fluids, and to maintain the rotor 20 in fixed position in the conical housing 11. The shaft 21 forms a fixed part of the rotor 20 and thus as the shaft is driven by some external source such as a motor, the rotor 20 is caused to directly rotate.

The rotor 20 is provided with a spiral groove 24 passing around the periphery of the rotor and extending the length thereof. The groove 24 is semi-circular in cross section and thus is adapted to receive and carry substantially half of the spherical balls employed to compress fluids in this pump. The housing 10 is provided with a plurality of endless ball passages which extend from the end housing 12 through the central conical housing 11 into the end housing 14 and thereupon return to the end housing 12. One of these complete endless paths is shown in Fig. 2 at 25. There are three such complete identical ball paths equally spaced around the periphery of this ball pump. As best shown in Fig. 2, the conical housing 11 is provided with a path 26 substantially equal in depth to the depth of the spiral groove 24 thus complementing the groove to form a full ball rolling chamber at the intersections of the path and groove. The balls employed in this pump completely fill the adjoining space of the spiral groove 24 and the path 26. The path 26 forms that portion of an endless ball passage designated by the numeral 27. As shown for the endless passage 25, the passage includes a portion 28 extending the length of the rotor 20 and thereupon enters a U bend 29 and thence passes through the long path 30 spaced from the periphery of the rotor and shielded therefrom by portions of the housing. A ball return loop or U bend 31 is provided at the inlet end of the pump and is arranged and constructed to deliver balls to the rotor carrying portion 28. A third endless ball passage 32 includes the rotor extending portion 33 and the outside ball return passage 34. As best shown in Fig. 1, the ball return passage 34 is located within a raised portion 35 in the housing 10. Similarly the return passage 30 and a return passage 36 for the ball paths 25 and 26, respectively, are provided with raised housing portions 37 and 38, respectively. The fluid after being compressed may be freely discharged through the opening 15 at the opposite end of the pump.

A plurality of balls 39 fill the three endless passages 25, 27 and 32. The balls in the U returns such as shown at 29 and 31 in the passage 25 abut each other as they do in the outside return passages 30, 34, and 36. However, during the rotor portion of the ball travel the balls are necessarily spaced a distance dependent upon the longitudinal distance between adjacent convolutions of the spiral semi-circular groove 24. In any event, in the operation of this ball pump, the balls move longitudinally of the rotor and not around the spiral passage 24. This is best evidenced by the balls within the path 26 which is the rotor portion of the ball path 27.

In operation, fluid including liquids and/or gases is admitted through the inlet conduit 13 whereupon rotation of the rotor 20 by an external power source causes a slight suction at the point of admission of the fluid. As the balls 39 enter the rotor portions of the several ball passages the fluid is entrained in the spiral groove between the balls in the several ball passages. The balls 39 are in constant movement about their respective paths and as the rotor 29 turns the balls are pushed forwardly within the paths such as shown at 26. As previously explained, the rotor 20 is conical in shape and its largest diameter is at the inlet side of the ball pump. As the balls progress longitudinally of the rotor 20 by reason of the rotation of the rotor, the space between the balls in the equally spaced passages gradually diminishes because of the reduced diameter of the cone-shaped rotor 20. The fluid is thus put under pressure and the chance of the fluid escaping backwardly through the forwardly rolling balls is practically nil. The complementary passages for the balls 39 including the spiral passage 24 in the rotor and the longitudinally extending passage 26 in the housing 10, are of such a size as to permit rolling of the balls 39 therewithin. It is thus very desirable to have these complementary ball passages the right size, but large tolerances may be permitted and the pump still have effective operation.

Wear by friction is practically eliminated by use of the plurality of balls as the fluid compressing medium and the fact that the rotor 20 is constantly rotating within three even peripherally spaced sets of balls. Thus the rotor has easy uninterrupted rotation conductive to efficient pump operation.

The efficiency of the pump may be increased by having a rotor of longer length whereupon inaccuracies of machining of the ball passages are negatived by reason of the number of balls within the passage on the rotor. There are many possible uses for a pump of this type and it is applicants' intention that the patent cover all such uses.

Numerous details of construction may be varied throughout a wide range without departing from the principles disclosed herein, and we therefore do not propose limiting the patent granted hereon otherwise than as necessitated by the appended claim.

What is claimed is:

A fluid pump comprising a housing including a central portion, an inlet end portion, and an outlet end portion, said inlet end portion having a fluid inlet, said outlet end portion having a fluid outlet, a driven rotor journaled within the central portion of said housing, said rotor having a spiral groove therein, said central housing portion having longitudinally extending passageways, said longitudinally extending passageways and said rotor spiral groove complementing each other wherever they intersect to form a full ball rolling chamber, and said housing having ball return passageways communicating with said longitudinally extending passageways and forming therewith endless ball paths, a plurality of balls in said combined passageways, whereby fluid entering the fluid inlet will be entrained in said rotor spiral groove between balls in said longitudinally extending passageways, and said rotor and central housing portion being similarly conical in shape with the larger diameters thereof at the inlet end portion whereby the entrained fluid is automatically compressed as it moves longitudinally of the pump from the inlet to the outlet.

STUART D. POOL.
RAYMOND D. TITUS.

REFERENCES CITED

The following references are of record in the file of this patent:

UNITED STATES PATENTS

| Number | Name | Date |
| --- | --- | --- |
| 1,332,153 | Andrews et al. | Feb. 24, 1920 |
| 1,427,823 | Kerr | Sept. 5, 1922 |
| 1,941,141 | Roth | Dec. 26, 1933 |

FOREIGN PATENTS

| Number | Country | Date |
| --- | --- | --- |
| 28,513 | Great Britain | 1906 |
| 320,038 | Germany | May 21, 1920 |